United States Patent [19]
Gross et al.

[11] Patent Number: 6,110,977
[45] Date of Patent: Aug. 29, 2000

[54] ALKYL POLYGLYCOSIDE COMPOSITIONS HAVING REDUCED VISCOSITY AND INHIBITED CRYSTALLIZATION

[75] Inventors: Stephen F. Gross, Souderton; Michael S. Wiggins, Lansdale; Ronald W. Broadbent, Horsham; David I. Devore, Langhorne; Timothy C. Morris, Morton, all of Pa.

[73] Assignee: Henkel Corporation, Gulph Mills, Pa.

[21] Appl. No.: 09/095,677

[22] Filed: Jun. 10, 1998

Related U.S. Application Data

[63] Continuation-in-part of application No. 08/783,224, Jan. 14, 1997, Pat. No. 5,827,453.
[60] Provisional application No. 60/049,338, Jun. 10, 1997.

[51] Int. Cl.$^7$ .............................. B01F 17/56; C11D 1/825
[52] U.S. Cl. ........................... 516/74; 516/134; 516/204; 510/470; 510/535
[58] Field of Search .................................. 516/134, 204, 516/920, 74; 510/470, 535

[56] References Cited

U.S. PATENT DOCUMENTS

| | | | |
|---|---|---|---|
| 2,572,886 | 10/1951 | DeGroote et al. | 568/606 |
| 3,623,988 | 11/1971 | Weimer | 510/535 |
| 3,671,458 | 6/1972 | Sherman et al. | 516/9 |
| 4,011,389 | 3/1977 | Langdon | 516/76 |
| 4,077,894 | 3/1978 | Langdon et al. | 252/76 |
| 4,077,895 | 3/1978 | Langdon et al. | 516/134 |
| 4,098,713 | 7/1978 | Jones | 510/351 |
| 4,375,565 | 3/1983 | Greif et al. | 568/622 |
| 5,266,690 | 11/1993 | McCurry, Jr. et al. | 536/18.6 |
| 5,370,816 | 12/1994 | Balzer et al. | 510/535 |
| 5,478,562 | 12/1995 | Cauwet et al. | 424/401 |
| 5,573,707 | 11/1996 | Cole et al. | 516/129 |
| 5,599,787 | 2/1997 | Schmid et al. | 510/470 |
| 5,728,895 | 3/1998 | Wiggins et al. | 568/601 |
| 5,827,453 | 10/1998 | Gross et al. | 510/535 |
| 5,877,245 | 3/1999 | Wiggins et al. | 568/618 |
| 5,895,605 | 4/1999 | Gross et al. | 510/470 |

*Primary Examiner*—Richard D. Lovering
*Assistant Examiner*—Daniel S. Metzmaier
*Attorney, Agent, or Firm*—John E. Drach; Henry E. Millson, Jr.

[57] ABSTRACT

Products of the reaction of epichlorohydrin and compounds having the formula II $$R_3(EO)_n(PO)_mOH \qquad (II)$$

wherein $R_3$ is an alkyl, alkenyl or arenyl group having from 4 to 22 carbon atoms; a substituted alkyl or alkenyl group having from 4 to 22 carbon atoms wherein; n is a number from 0 to 50 and m is a number from 0 to 10; wherein the mole ratio of epichlorohydrin to (II) is from about 0.60/1 to about 2/1 are extremely efficient defoamers for aqueous surfactant systems are effective as defoamers, viscosity reducers and crystallization preventives for aqueous surfactant solutions, particularly alkyl polyglycosides.

44 Claims, 1 Drawing Sheet

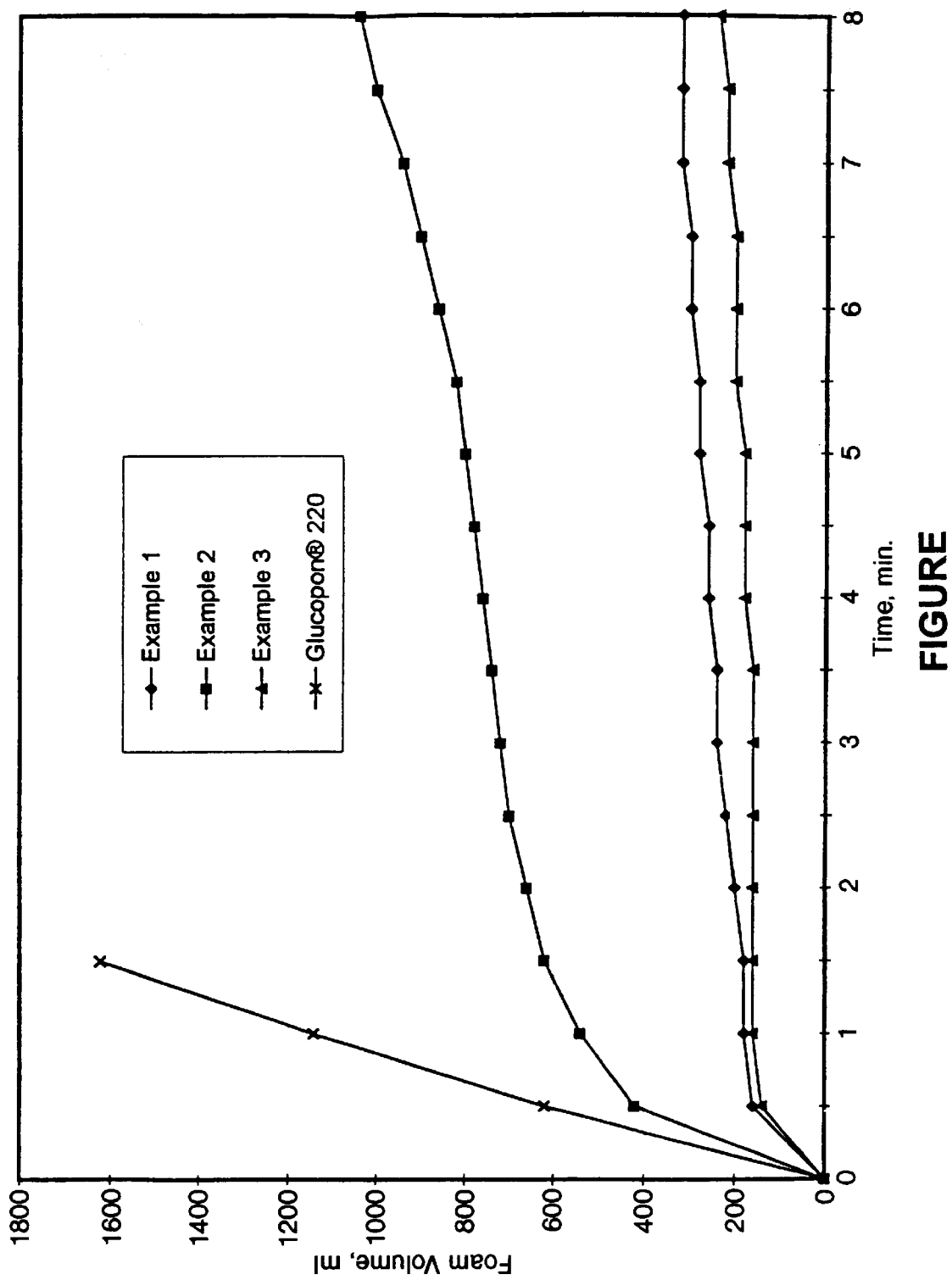

ALKYL POLYGLYCOSIDE COMPOSITIONS HAVING REDUCED VISCOSITY AND INHIBITED CRYSTALLIZATION

CROSS-REFERENCE TO RELATED APPLICATIONS

This application is a continuation-in-part of application Ser. No. 08/783,224, filed on Jan. 14, 1997, now U.S. Pat. No. 5,827,453. This application also claims the benefit of copending provisional application serial No. 60/049,338, filed on Jun. 10, 1997.

STATEMENT REGARDING FEDERALLY SPONSORED RESEARCH OR DEVELOPMENT

Not Applicable.

BACKGROUND OF THE INVENTION

Aqueous cleaning compositions exhibit a tendency toward foaming because they contain surface active agents such as soaps, and synthetic detergents. In many instances, such cleaning compositions produce excessive foam and the user must use substances known as anti-foaming agents or defoamers. Some defoamers such as silicones tend to interfere with the function of the cleaning compositions in that unwanted residues are left after the cleaners are wiped off while others are environmentally unacceptable because they are not biodegradable.

Alkyl polyglycosides are a class of nonionic surfactants that exhibit significantly higher foaming profiles than other nonionic surfactants, such as alcohol ethoxylates. In fact, it can be said that the foaming tendencies of alkyl polyglycosides more closely resemble those of anionic surfactants, such as alcohol sulfates, than the foaming tendencies of other nonionic surfactants. This higher foaming tendency makes the use of alkyl polyglycosides undesirable for many applications, e.g., cleaning-in-place for food processing plants, high pressure spray cleaning, bottle washing, floor cleaners and automatic dishwashing, wherein high levels of foam interfere with the cleaning and rinsing operation and reduce the efficiency of the operation.

Low foam nonionics, such as EO/PO block copolymers, can be used to reduce the foaming properties of alkyl polyglycoside surfactants, but these materials have undesirable properties, e.g., low biodegradability, relatively high aquatic toxicity and poor caustic compatibility.

Accordingly, there is a need for the development of defoamers that do not interfere with the cleaning ability of aqueous cleaning compositions and that are biodegradable, exhibit low aquatic toxicity and good caustic compatibility.

Certain alkyl polyglycosides, most notably $C_{12-16}$ alkyl polyglycosides, have a tendency to crystallize during storage at ambient temperatures due to their supersaturated state. These same alkyl polyglycosides also exhibit unacceptably high viscosities which makes transferring them such as by pouring or pumping difficult. Upon crystallization, the alkyl polyglycosides become turbid, i.e., cloudy and opaque in appearance due to the solids contained therein falling out of their supersaturated state which, when coupled with the resultant non-homogeneous state of the crystallized solution and the attendant difficulties in handling operations such as pumping, is a highly undesirable phenomenon. In order to rectify this undesirable physical state, the alkyl polyglycoside composition must be heated in order to resolvate the crystals. As can be imagined, this process is both expensive and time-consuming. Thus, there is a need for methods of either reducing or eliminating the tendency of alkyl polyglycosides to crystallize during prolonged storage under ambient conditions. There is also a need for viscosity reducing additives which are more efficient than current additives since conventional additives must be added in amounts of up to 8% by weight to achieve certain desired viscosity reductions.

SUMMARY OF THE INVENTION

The surprising discovery has been made that the products of the reaction of epichlorohydrin and compounds having the formula II $$R_3(EO)_n(PO)_m\text{—OH} \qquad (II)$$

wherein $R_3$ is an alkyl, alkenyl or arenyl group having from 4 to 22 carbon atoms; a substituted alkyl or alkenyl group having from 4 to 22 carbon atoms wherein; n is a number from 0 to 50 and m is a number from 0 to 10; wherein the mole ratio of epichlorohydrin to (II) is from about 0.60/1 to about 2/1 are extremely efficient defoamers for aqueous surfactant systems. These reaction products are added to a surfactant in an amount sufficient to reduce or eliminate foam. The reaction products are also useful in reducing the viscosity of alkyl polyglycoside solutions having an alkyl polyglycoside content of at least about 50% by weight. The reaction products are further useful in preventing the crystallization of solids from aqueous alkyl polyglycoside solutions, particularly $C_{12-16}$ alkyl polyglycoside solutions having aN alkyl polyglycoside content of at least about 50% by weight. The reaction products have the advantage of being totally dispersible in water, are readily biodegradable, contain no organic solvents and do not affect the detergency of surfactants with which they are used because they are nonionic surfactants in themselves.

The reaction products according to the invention permit the production of readily flowable aqueous alkyl polyglycoside solutions, particularly $C_{12-16}$ alkyl polyglycoside solutions containing a minimal amount of an additive. These products also prevent the formation of crystals which obviates the need to heat and agitate the aqueous alkyl polyglycoside solutions, particularly $C_{12-16}$ alkyl polyglycoside solutions to redissolve the crystals prior to use.

BRIEF DESCRIPTION OF THE SEVERAL VIEWS OF THE DRAWING

FIG. 1 shows the relative defoaming effect of 0.1% by weight of a defoamer from Examples 1–3 on GLUCOPON® 220 Surfactant in soft water at 25° C. under the test protocol of Example 4.

DETAILED DESCRIPTION OF THE INVENTION

When used as defoamers, the compounds according to the invention, which are reaction products as described herein below, are added to a surfactant-water system comprised of one or more surfactants in an amount effective to eliminate or decrease the foam generated by the surfactant as a result of some type of mechanical action such as mixing, pouring, and/or shaking. The amount required to eliminate and/or decrease foam is defined as a defoaming effective amount and will vary from one instance to another depending upon the nature of the surfactant or mixture of surfactants and the defoaming effect desired. A defoaming effective amount will be readily determinable by one of ordinary skill in the art. When the surfactant is one or more alkyl polyglycosides, the defoaming effective amount will typically vary from a weight ratio of alkyl polyglycoside/defoamer 4.0/1.0 to about 1.0/1.0.

When used as viscosity reducers, the compounds according to the invention are added to aqueous alkyl polyglycoside solutions having an alkyl polyglycoside content of at least about 50% by weight. The amount required to reduce the viscosity is defined as a viscosity reducing effective amount and will vary from one instance to another depending upon the nature of the aqueous alkyl polyglycoside solutions. The amount required in any particular instance will be readily determinable by those of ordinary skill in the art. A viscosity reducing effective amount will be readily determinable by one of ordinary skill in the art and will typically vary from 0.5% to about 5% by weight.

When used to prevent crystallization of solids from alkyl polyglycoside solutions, the compounds according to the invention are added to aqueous alkyl polyglycoside solutions having an alkyl polyglycoside content of at least about 50% by weight. The amount required to prevent solids crystallization is defined as an effective amount and will vary from one instance to another depending upon the nature of the aqueous alkyl polyglycoside solutions. The amount required in any particular instance will be readily determinable by those of ordinary skill in the art. An effective amount to prevent solids crystallization will be readily determinable by one of ordinary skill in the art and will typically vary from 0.5% to about 5% by weight.

While the compounds according to the invention are effective in reducing the viscosity and/or preventing the crystallization of any aqueous alkyl polyglycoside solution, they are particularly applicable to $C_{12-16}$ alkyl polyglycoside solutions which have a greater tendency to crystallize upon prolonged standing at room temperature and to exhibit high viscosities.

The compositions according to the invention are the products of the reaction of epichlorohydrin and compounds having the formula II $$R_3(EO)_n(PO)_mOH \qquad (II)$$

wherein $R_3$ is a substituted or unsubstituted, saturated or unsaturated aliphatic moiety having from 4 to 22 carbon atoms; a substituted alkyl or alkenyl group having from 4 to 22 carbon atoms wherein; n is a number from 0 to 50 and m is a number from 0 to 10; and epichlorohydrin wherein the mole ratio of epichlorohydrin to (II) is from about 0.60/1 to about 2/1 and preferably from about 0.80/1 to about 2/1.

In regard to the alkoxylates of formula II, $R_3$ can be any substituted or unsubstituted, saturated or unsaturated aliphatic moiety having from 4 to 22 carbon atoms. Thus $R_3$ can be a linear or branched alkyl group, a linear or branched alkenyl or alkenyl group, a saturated carbocyclic moiety, an unsaturated carbocyclic moiety having one or more multiple bonds, a saturated heterocyclic moiety, an unsaturated heterocyclic moiety having one or more multiple bonds, a substituted linear or branched alkyl group, a substituted linear or branched alkenyl or alkynyl group, a substituted saturated carbocyclic moiety, a substituted unsaturated carbocyclic moiety having one or more multiple bonds, a substituted saturated heterocyclic moiety, a substituted unsaturated heterocyclic moiety having one or more multiple bonds. Examples of the above include but are not limited to an alkyl group having from 4 to 22 carbon atoms, an alkenyl group having from 4 to 22 carbon atoms, an alkynyl group having from 4 to 22 carbon atoms. $R_3$ can also be an arenyl group. Arenyl groups are alkyl-substituted aromatic radicals having a free valence at an alkyl carbon atom such as a benzylic group. The preferred value of $R_3$ is an alkyl group having from 4 to 22 carbon atoms and most preferably an alkyl group having from 8 to 10 carbon atoms. The degree of ethoxylation is preferably from 2 to about 50 with the most preferred being from about 4 to about 50 while the degree of propoxylation can vary from 0 to 10. The degree of propoxylation will be determined by the desired degree of water solubility or miscibility. The water solubility or miscibility will ultimately be determined by such factors as the number of carbon atoms in $R_3$, the relative amounts EO to PO and the effect of PO on the biodegradability of the final defoamer. The water solubility or miscibility of a defoamer according to the invention and the interrelationships between the number of carbon atoms in $R_3$, the relative amounts of EO and PO and the biodegradability of the final product will be readily determinable by one of ordinary skill in the art.

While the method according to the invention can be used to control foam generated by any type of surfactant or blend of surfactants, it is especially useful for controlling foam in compositions containing one or more alkyl polyglycoside surfactants.

The alkyl polyglycosides which can be used in the invention have the formula I $$R_1O(R_2O)_b(Z)_a \qquad I$$

wherein $R_1$ is a monovalent organic radical having from about 6 to about 30 carbon atoms; $R_2$ is a divalent alkylene radical having from 2 to 4 carbon atoms; Z is a saccharide residue having 5 or 6 carbon atoms; b is a number having a value from 0 to about 12; a is a number having a value from 1 to about 6. Preferred alkyl polyglycosides which can be used in the compositions according to the invention have the formula I wherein Z is a glucose residue and b is zero. Such alkyl polyglycosides are commercially available, for example, as APG®, GLUCOPON®, or PLANTAREN® surfactants from Henkel Corporation, Ambler, Pa. 19002. Examples of such surfactants include but are not limited to:

1. APG® 225 Surfactant—an alkyl polyglycoside in which the alkyl group contains 8 to 10 carbon atoms and having an average degree of polymerization of 1.7.
2. APG® 425 Surfactant—an alkyl polyglycoside in which the alkyl group contains 8 to 16 carbon atoms and having an average degree of polymerization of 1.5.
3. APG® 625 Surfactant—an alkyl polyglycoside in which the alkyl group contains 12 to 16 carbon atoms and having an average degree of polymerization of 1.6.
4. APG® 325 Surfactant—an alkyl polyglycoside in which the alkyl group contains 9 to 11 carbon atoms and having an average degree of polymerization of 1.5.
5. GLUCOPON® 600 Surfactant—an alkyl polyglycoside in which the alkyl group contains 12 to 16 carbon atoms and having an average degree of polymerization of 1.4.
6. PLANTAREN® 2000 Surfactant—a $C_{8-16}$ alkyl polyglycoside in which the alkyl group contains 8 to 16 carbon atoms and having an average degree of polymerization of 1.5.
7. PLANTAREN® 1300 Surfactant—a $C_{12-16}$ alkyl polyglycoside in which the alkyl group contains 12 to 16 carbon atoms and having an average degree of polymerization of 1.6.
8. GLUCOPON® 220 Surfactant—an alkyl polyglycoside in which the alkyl group contains 8 to 10 carbon atoms and having an average degree of polymerization of 1.5.

Other examples include alkyl polyglycoside surfactant compositions which are comprised of mixtures of compounds of formula I wherein Z represents a moiety derived from a reducing saccharide containing 5 or 6 carbon atoms; a is a number having a value from 1 to about 6; b is zero; and $R_1$ is an alkyl radical having from 8 to 20 carbon atoms. The compositions are characterized in that they have increased surfactant properties and an HLB in the range of about 10 to about 16 and a non-Flory distribution of glycosides, which is comprised of a mixture of an alkyl monoglycoside and a mixture of alkyl polyglycosides having varying degrees of polymerization of 2 and higher in progressively decreasing amounts, in which the amount by weight of polyglycoside having a degree of polymerization of 2, or mixtures thereof with the polyglycoside having a degree of polymerization of 3, predominate in relation to the amount of monoglycoside, said composition having an average degree of polymerization of about 1.8 to about 3. Such compositions, also known as peaked alkyl polyglycosides, can be prepared by separation of the monoglycoside from the original reaction mixture of alkyl monoglycoside and alkyl polyglycosides after removal of the alcohol. This separation may be carried out by molecular distillation and normally results in the removal of about 70–95% by weight of the alkyl monoglycosides. After removal of the alkyl monoglycosides, the relative distribution of the various components, mono- and polyglycosides, in the resulting product changes and the concentration in the product of the polyglycosides relative to the monoglycoside increases as well as the concentration of individual polyglycosides to the total, i.e., DP2 and DP3 fractions in relation to the sum of all DP fractions. Such compositions are disclosed in U.S. Pat. No. 5,266,690, the entire contents of which are incorporated herein by reference.

EXAMPLE 1

About 150 grams of decyl alcohol ethoxylated with an average of 4 moles of ethylene oxide (0.45 OH equivalents) were mixed with 385 grams of toluene and 54 grams of 50% aq. NaOH (0.675 equivalents). The water was removed by azeotropic distillation and when a moisture level of less than 0.8% was reached, about 46 grams (0.51 equivalents) of epichlorohydrin were slowly added. This mixture was allowed to react at 100–110° C. for 24 hours. An aliquot of this mixture was removed and filtered to remove the NaCl and vacuum stripped to remove the toluene to give an amber, easily pourable liquid product that was dispersible in water. When about 1 gram of this liquid was shaken with 1 gram of decyl alcohol ethoxylated with an average of 4 moles of ethylene oxide in 50 grams of DI water, very little foam was observed. When 1 gram of decyl alcohol ethoxylated with an average of 4 moles of ethylene oxide in 50 grams of DI water was shaken, a very large amount of foam was observed.

EXAMPLE 2

About 51 grams of butanol ethoxylated with an average of 2 moles of ethylene oxide (0.32 OH equivalents) were mixed with 120 grams of toluene and 25 grams of 50% aq. NaOH (0.32 equivalents). The water was removed by azeotropic distillation and when a moisture level of less than 0.8% was reached, about 46 grams (0.24 equivalents) of epichlorohydrin were slowly added. This mixture was allowed to react at 100–110° C. for 24 hours. An aliquot of this mixture was removed and filtered to remove the NaCl and vacuum stripped to remove the toluene to give an amber, easily pourable liquid product that was insoluble in water. When about 1 gram of this liquid was shaken with 1 gram of decyl alcohol ethoxylated with an average of 4 moles of ethylene oxide in 50 grams of DI water, very little foam was observed.

EXAMPLE 3

About 200.0 gm (0.654 hydroxyl equivs.) of octyl alcohol ethoxylated with an average of 4 moles of ethylene oxide was mixed with 400 gm toluene and 78.4 gm (0.98 equivs.) of 50% NaOH. Water was removed by azeotropic distillation until the level was below 0.8%. The mixture was cooled to 80° C. and 67.2 gm (0.72 moles) of epichlorohydrin was added over 45 mins. The mixture was stirred for 24 hrs at 110° C. until the epoxy titration showed no epoxide left. The material was cooled, filtered and the toluene was removed by vacuum distillation leaving a dark brown low viscosity liquid.

EXAMPLE 4

A test mixture was prepared by mixing 51 parts (dry solids basis) of GLUCOPON® 220 Surfactant and 15 parts of a defoamer of Examples 1–3. The amount of foam produced by a 0.1% actives test mixture in water was compared with that of a 0.1% actives GLUCOPON® 220 Surfactant in water according to the method below. The data from this test is depicted graphically in FIG. 1.

The foam cell consists of a 2-liter jacketed graduate, peristaltic pump with variable voltage controller, and silicone and glass tubing. A test mixture is circulated at a constant temperature and flow rate, and falls from a constant height of 30 cm back into itself, creating foam. The tests are run under the following three sets of conditions: In the first test, a 0.1% active solution of the test surfactant in soft (10–15 ppm) water is circulated at 25° C. and the foam volume is read every 30 seconds. In the second test, a 0.1% active solution in 1% NaOH is circulated at 25° C., and the foam volume is read every 30 seconds. In the third test, a 0.1% active solution in 1% NaOH is circulated. After 30 seconds, the foam volume is read and 1 ml of 1% TEA LAS solution is simultaneously added as a test-foamer. After another 30 seconds, the foam volume is read. About 30 seconds later, another 1 ml of 1% TEA LAS is added, and the foam volume is read 30 seconds after that. This cycle, in which every 30 seconds the test-foamer is added and 30 seconds later the foam volume read, is repeated until the foam volume exceeds 1,500 ml. The test is carried out both at 25° C. and at 49° C. This method gives us an indication of the antifoam capacity of the test surfactant. The relative defoaming characteristics of compounds according to the invention as measured by this method is shown in the figure.

EXAMPLE 5

Table 1 below illustrates the effect on the viscosity of an alkyl polyglycoside of the presence of a compound according to the invention. Table 2 below illustrates the effect on the prevention of crystal formation of an alkyl polyglycoside of the presence of a compound according to the invention.

TABLE 1

| | Viscosity in centipoise | | |
|---|---|---|---|
| Composition | 20° C. | 25° C. | 30° C. |
| Control[1] | 68,900 | 25,300 | 12,400 |
| A | 8,010 | 3,555 | 2,165 |
| B | 3,750 | 1,955 | 1,270 |

[1]- GLUCOPON ® 625 Surfactant
A- GLUCOPON ® 625 Surfactant + 1% by weight of reaction product of Example 2.
B- GLUCOPON ® 625 Surfactant + 2% by weight of reaction product of Example 2.

TABLE 2

| Composition | Initial Appearance | Appearance after 10 months |
| --- | --- | --- |
| Control[1] | Hazy, no crystals | Opaque, heavy crystals |
| A | Hazy, no crystals | Hazy, no crystals |

[1] - GLUCOPON ® 625 Surfactant
A - GLUCOPON ® 625 Surfactant + 1% by weight of reaction product of Example 2. GLUCOPON ® 625 Surfactant is a 50% aqueous $C_{12-16}$ alkyl polyglycoside solution.

What is claimed is:

1. A process for reducing the viscosity of an aqueous alkyl polyglycoside solution having at least about 50% by weight of alkyl polyglycoside, comprising adding to said alkyl polyglycoside solution a viscosity reducing amount within the range from about 0.5 to about 5% by weight of a composition which is the product of the process which consist essentially of reacting epichlorohydrin and a compound of the formula II;

$$R_3(EO)_n(PO)_mOH \qquad (II)$$

wherein $R_3$ is an alkyl, alkenyl or arenyl group having from 4 to 22 carbon atoms; wherein n is a number from 0 to 50 and m is a number from 0 to 10; wherein the mole ratio of epichlorohydrin to (II) is from about 0.60/1 to about 2/1; and wherein (EO) defines an ethylene oxide unit and (PO) defines a propylene oxide unit.

2. The process of claim 1 wherein $R_3$ is an alkyl group having from 4 to 12 carbon atoms.

3. The process of claim 1 wherein $R_3$ is an alkyl group having from 8 to 10 carbon atoms.

4. The process of claim 1 wherein n is a number from about 2 to about 50.

5. The process of claim 1 wherein the alkyl polyglycoside is a $C_{12-16}$ alkyl polyglycoside.

6. The process of claim 1 wherein $R_3$ is an alkyl group having from 4 to 12 carbon atoms and n is a number from about 2 to about 50.

7. The process of claim 1 wherein $R_3$ is an alkyl group having from 8 to 10 carbon atoms and n is a number from about 4 to about 50.

8. A process for reducing the viscosity of an aqueous alkyl polyglycoside solution having at least about 50% by weight of alkyl polyglycoside, comprising adding to said alkyl polyglycoside solution a viscosity reducing amount within the range from about 0.5 to about 5% by weight of a composition which is the product of the process which consist essentially of reacting epichlorohydrin and a compound of the formula II;

$$R_3(EO)_n(PO)_mOH \qquad (II)$$

wherein $R_3$ is an alkyl, alkenyl or arenyl group having from 4 to 22 carbon atoms; wherein n is a number from 0 to 50 and m is a number from 0 to 10; wherein the mole ratio of epichlorohydrin to (II) is from about 0.60/1 to about 2/1; and wherein (EO) defines an ethylene oxide unit and (PO) defines a propylene oxide unit, and the alkyl polyglycoside is a compound of formula I;

$$R_1O(R_2O)_b(Z)_a \qquad (I)$$

wherein $R_1$, is a monovalent organic radical having from about 6 to about 30 carbon atoms; $R_2$ is a divalent alkylene radical having from 2 to 4 carbon atoms; Z is a saccharide residue having 5 to 6 carbon atoms; b is a number having a value from 0 to about 12; a is a number having a value from 1 to about 6.

9. The process of claim 8 wherein $R_3$ is an alkyl group having from 4 to 12 carbon atoms.

10. The process of claim 8 wherein $R_3$ is an alkyl group having from 8 to 10 carbon atoms.

11. The process of claim 8 wherein n is a number from about 2 to about 50.

12. The process of claim 8 wherein the alkyl polyglycoside is a $C_{12-16}$ alkyl polyglycoside.

13. The process of claim 8 wherein $R_3$ is an alkyl group having from 4 to 12 carbon atoms and n is a number from about 2 to about 50.

14. The process of claim 8 wherein $R_3$ is an alkyl group having from 8 to 10 carbon atoms and n is a number from about 4 to about 50.

15. The process of claim 8 wherein $R_1$ is an alkyl group having from about 8 to about 10 carbon atoms and a is about 1.5.

16. A process for preventing the crystallization of solids from an aqueous alkyl polyglycoside solution having at least about 50% by weight of alkyl polyglycoside, comprising adding to said alkyl polyglycoside solution a solid crystallization prevention amount within the range from about 0.5 to about 5% by weight of a composition which is the product of the process which consists essentially of reacting epichlorohydrin and a compound of the formula II;

$$R_3(EO)_n(PO)_mOH \qquad (II)$$

wherein $R_3$ is an alkyl, alkenyl or arenyl group having from 4 to 22 carbon atoms; wherein n is a number from 0 to 50 and m is a number from 0 to 10; wherein the mole ratio of epichlorohydrin to (II) is from about 0.60/1 to about 2/1; and wherein (EO) defines an ethylene oxide unit and (PO) defines a propylene oxide unit.

17. The process of claim 16 wherein $R_3$ is an alkyl group having from 4 to 12 carbon atoms.

18. The process of claim 16 wherein $R_3$ is an alkyl group having from 8 to 10 carbon atoms.

19. The process of claim 16 wherein n is a number from about 2 to about 50.

20. The process of claim 16 wherein the alkyl polyglycoside is a $C_{12-16}$ alkyl polyglycoside.

21. The process of claim 16 wherein $R_3$ is an alkyl group having from 4 to 12 carbon atoms and n is a number from about 2 to about 50.

22. The process of claim 16 wherein $R_3$ is an alkyl group having from 8 to 10 carbon atoms and n is a number from about 4 to about 50.

23. A process for reducing the viscosity of an aqueous alkyl polyglycoside solution having at least about 50% by weight of alkyl polyglycoside, comprising adding to said alkyl polyglycoside solution a viscosity reducing amount within the range from about 0.5 to about 5% by weight of a composition which consist of the reaction product of epichlorohydrin and a compound of the formula II;

$$R_3(EO)_n(PO)_mOH \qquad (II)$$

wherein $R_3$ is an alkyl, alkenyl or arenyl group having from 4 to 22 carbon atoms; wherein n is a number from 0 to 50 and m is a number from 0 to 10; wherein the mole ratio of epichlorohydrin to (II) used to form the reaction product is from about 0.60/1 to about 2/1; and wherein (EO) defines an ethylene oxide unit and (PO) defines a propylene oxide unit, and the alkyl polyglycoside is a compound of formula I;

$$R_1O(R_2O)_b(Z)_a \qquad (I)$$

wherein $R_1$, is a monovalent organic radical having from about 6 to about 30 carbon atoms; $R_2$ is a divalent alkylene radical having from 2 to 4 carbon atoms; Z is a saccharide residue having 5 to 6 carbon atoms; b is a number having a value from 0 to about 12; a is a number having a value from 1 to about 6.

24. The process of claim 23 wherein $R_3$ is an alkyl group having from 4 to 12 carbon atoms.

25. The process of claim 23 wherein $R_3$ is an alkyl group having from 8 to 10 carbon atoms.

26. The process of claim 23 wherein n is a number from about 2 to about 50.

27. The process of claim 23 wherein the alkyl polyglycoside is a $C_{12-16}$ alkyl polyglycoside.

28. The process of claim 23 wherein $R_3$ is an alkyl group having from 4 to 12 carbon atoms and n is a number from about 2 to about 50.

29. The process of claim 23 wherein $R_3$ is an alkyl group having from 8 to 10 carbon atoms and n is a number from about 4 to about 50.

30. The process of claim 23 wherein $R_1$ is an alkyl group having from about 8 to about 10 carbon atoms and a is about 1.5.

31. A composition comprising an aqueous alkyl polyglycoside solution having at least about 50% by weight of alkyl polyglycoside, and a viscosity-reducing effective amount within the range from about 0.5 to about 5% by weight of a composition which consist of the reaction product of epichlorohydrin and a compound of the formula II;

$$R_3(EO)_n(PO)_mOH \qquad (II)$$

wherein $R_3$ is an alkyl, alkenyl or arenyl group having from 4 to 22 carbon atoms; wherein n is a number from 0 to 50 and m is a number from 0 to 10; wherein the mole ratio of epichlorohydrin to (II) is from about 0.60/1 to about 2/1; and wherein (EO) defines an ethylene oxide unit and (PO) defines a propylene oxide unit.

32. The composition of claim 31 wherein $R_3$ is an alkyl group having from 4 to 12 carbon atoms.

33. The composition of claim 31 wherein $R_3$ is an alkyl group having from 8 to 10 carbon atoms.

34. The composition of claim 31 wherein n is a number from about 2 to about 50.

35. The composition of claim 31 wherein the alkyl polyglycoside is a $C_{12-16}$ alkyl polyglycoside.

36. The composition of claim 31 wherein $R_3$ is an alkyl group having from 4 to 12 carbon atoms and n is a number from about 2 to about 50.

37. The composition of claim 31 wherein $R_3$ is an alkyl group having from 8 to 10 carbon atoms and n is a number from about 4 to about 50.

38. A composition comprising an aqueous alkyl polyglycoside solution having at least about 50% by weight of alkyl polyglycoside, and a crystallization-preventive effective amount within the range from about 0.5 to about 5% by weight of a composition which consist essentially of the reaction product of epichlorohydrin and a compound of the formula II;

$$R_3(EO)_n(PO)_mOH \qquad (II)$$

wherein $R_3$ is an alkyl, alkenyl or arenyl group having from 4 to 22 carbon atoms; wherein n is a number from 0 to 50 and m is a number from 0 to 10; wherein the mole ratio of epichlorohydrin to (II) is from about 0.60/1 to about 2/1; and wherein (EO) defines an ethylene oxide unit and (PO) defines a propylene oxide unit.

39. The composition of claim 38 wherein $R_3$ is an alkyl group having from 4 to 12 carbon atoms.

40. The composition of claim 38 wherein $R_3$ is an alkyl group having from 8 to 10 carbon atoms.

41. The composition of claim 38 wherein n is a number from about 2 to about 50.

42. The composition of claim 38 wherein the alkyl polyglycoside is a $C_{12-16}$ alkyl polyglycoside.

43. The composition of claim 38 wherein $R_3$ is an alkyl group having from 4 to 12 carbon atoms and n is a number from about 2 to about 50.

44. The composition of claim 38 wherein $R_3$ is an alkyl group having from 8 to 10 carbon atoms and n is a number from about 4 to about 50.

* * * * *